US012768174B2

(12) United States Patent
De Rick

(10) Patent No.: US 12,768,174 B2
(45) Date of Patent: Oct. 20, 2026

(54) FLOOR ELEMENT FOR FORMING A FLOOR COVERING AND A FLOOR COVERING

(71) Applicant: Unilin BV, Wielsbeke (BE)

(72) Inventor: Jan De Rick, Geraardsbergen (BE)

(73) Assignee: Unilin BV, Wielsbeke (BE)

( * ) Notice: Subject to any disclaimer, the term of this patent is extended or adjusted under 35 U.S.C. 154(b) by 354 days.

(21) Appl. No.: 18/558,662

(22) PCT Filed: Apr. 27, 2022

(86) PCT No.: PCT/IB2022/053902
§ 371 (c)(1),
(2) Date: Nov. 2, 2023

(87) PCT Pub. No.: WO2022/234400
PCT Pub. Date: Nov. 10, 2022

(65) Prior Publication Data

US 2024/0229474 A1 Jul. 11, 2024

Related U.S. Application Data

(60) Provisional application No. 63/183,807, filed on May 4, 2021.

(51) Int. Cl.
*E04F 15/02* (2006.01)
*B32B 3/06* (2006.01)
(Continued)

(52) U.S. Cl.
CPC .......... *E04F 15/02038* (2013.01); *B32B 3/06* (2013.01); *B32B 3/30* (2013.01); (Continued)

(58) Field of Classification Search
CPC .......... E04F 15/02033; E04F 15/02038; E04F 15/107; E04F 15/102; E04F 15/02; (Continued)

(56) References Cited

U.S. PATENT DOCUMENTS 10,677,275 B1 * 6/2020 Caselli .............. E04F 15/02033
10,760,285 B2 * 9/2020 Patki ..................... E04F 15/107
(Continued)

FOREIGN PATENT DOCUMENTS

WO 0198603 A2 12/2001
WO 2004097141 A2 11/2004
(Continued)

OTHER PUBLICATIONS

International Search Report and Written Opinion of the International Searching Authority, issued Aug. 4, 2022 in International Patent Application No. PCT/IB2022/053902 filed Apr. 27, 2022.

*Primary Examiner* — Chi Q Nguyen
(74) *Attorney, Agent, or Firm* — Ryan D. Jenlink; Conley Rose, P.C.

(57) ABSTRACT

A floor element including a support layer having an upper surface and a decorative layer on the upper surface, a first edge and a second edge forming a first pair of opposite sides, a third edge and a fourth edge forming a second pair of opposite sides, and coupling elements on at least the first pair of opposite sides. The coupling elements include a tongue having an upper surface and a lower surface and a groove having a base, an upper lip having a lower surface extending from the base to the second edge and a lower lip extending from the base beyond the upper lip. When two floor elements are coupled, a cavity is formed between the first edge of the support layer of one floor element and the support layer of another floor element.

20 Claims, 3 Drawing Sheets

(51) Int. Cl.

| | |
|---|---|
| ***B32B 3/30*** | (2006.01) |
| ***B32B 7/02*** | (2019.01) |
| ***B32B 9/00*** | (2006.01) |
| ***B32B 9/04*** | (2006.01) |
| ***B32B 27/08*** | (2006.01) |
| ***B32B 27/30*** | (2006.01) |
| ***E04F 15/08*** | (2006.01) |

(52) U.S. Cl.
CPC ................ *B32B 7/02* (2013.01); *B32B 9/005* (2013.01); *B32B 9/045* (2013.01); *B32B 27/08* (2013.01); *B32B 27/304* (2013.01); *E04F 15/02033* (2013.01); *E04F 15/087* (2013.01); *B32B 2255/26* (2013.01); *B32B 2307/7376* (2023.05); *B32B 2419/04* (2013.01); *E04F 2201/0161* (2013.01); *E04F 2201/023* (2013.01); *E04F 2201/042* (2013.01); *E04F 2201/043* (2013.01)

(58) Field of Classification Search
CPC ......... E04F 15/04; E04F 15/087; E04F 15/10; E04F 15/18; E04F 2201/0115; E04F 2201/042; E04F 2201/0107; E04F 2201/03; E04F 2201/0552; E04F 2201/023; E04F 2201/0525; E04F 2201/0547; E04F 2201/043; E04F 2201/0153; E04F 2201/0138; E04F 2201/0161; B32B 3/06; B32B 3/30; B32B 7/02; B32B 9/005; B32B 9/045; B32B 27/08; B32B 27/304; B32B 2307/7376; B32B 2255/26; B32B 2419/04
See application file for complete search history.

(56) References Cited

U.S. PATENT DOCUMENTS

| | | | | |
|---|---|---|---|---|
| 10,822,810 | B2 * | 11/2020 | Patki | B32B 27/06 |
| 11,339,576 | B2 * | 5/2022 | Caselli | C04B 37/028 |
| 12,110,694 | B2 * | 10/2024 | Patki | E04F 15/087 |
| 12,152,626 | B2 * | 11/2024 | Caselli | E04F 21/22 |
| 12,366,073 | B2 * | 7/2025 | Patki | B32B 38/08 |
| 2007/0261350 | A1 * | 11/2007 | Hahn | E04F 15/02033 52/582.1 |
| 2012/0240502 | A1 | 9/2012 | Wilson et al. | |
| 2013/0104485 | A1 * | 5/2013 | Meersseman | B27N 7/00 428/53 |
| 2020/0011071 | A1 * | 1/2020 | Patki | B32B 38/08 |
| 2020/0141129 | A1 * | 5/2020 | Patki | B32B 3/06 |
| 2021/0079666 | A1 * | 3/2021 | Caselli | B32B 18/00 |
| 2021/0348397 | A1 * | 11/2021 | Caselli | E04F 15/087 |

FOREIGN PATENT DOCUMENTS

| | | | |
|---|---|---|---|
| WO | 2008097860 | A2 | 8/2008 |
| WO | 2020172003 | A1 | 8/2020 |
| WO | 2021059062 | A1 | 4/2021 |

* cited by examiner

FLOOR ELEMENT FOR FORMING A FLOOR COVERING AND A FLOOR COVERING

CROSS REFERENCE TO RELATED APPLICATIONS

This application is a filing under 35 U.S.C. 371 of International Application No. PCT/IB2022/053902, filed Apr. 27, 2022, entitled "A FLOOR ELEMENT FOR FORMING A FLOOR COVERING AND A FLOOR COVERING," which claims priority to U.S. Provisional Patent Application No. 63/183,807, filed May 4, 2021, which is incorporated herein by reference in its entirety.

TECHNICAL FIELD

The present invention relates to a floor element for forming a floor covering and a floor covering made up of a plurality of floor elements.

BACKGROUND

More particularly, the invention relates to a floor element for forming a floor covering, wherein this floor element comprises a decorative layer made for example of a brittle material such as natural stone, glass or sintered ceramic materials like porcelain, earthenware or the like. The decorative layer can, for example, be a ceramic tile.

Traditionally, ceramic tiles are installed by laying them side by side on a surface such as a floor or wall. Typically, an adhesive compound is used to attach the tiles to the surface. Seams between the tiles are grouted. In this way, the tiles are bonded to a rigid surface, for example a concrete subfloor, thereby improving their impact strength. The bond with the subfloor, and thus also with the structure of the dwelling, also leads to a high attenuation of walking sounds, both in the room where the floor is installed, and in quarters below the respective room. The tiled surface is water impervious and hygienic, since it can be cleaned in a very wet manner. The step of installing the tiles with an adhesive is, however, labor-intensive and represents a significant portion of the labor involved in a typical floor covering installation. Moreover, this installing technique requires high professional competence in order to obtain a well levelled floor covering. Thus, due to the time and labor involved in the installation, it is typically quite costly to have tiles professionally installed.

To substitute an existing floor covering made of tiles, it is often necessary to break the tiles, regenerate the surface by removing the residues of adhesive and then install a new floor covering. Thus, the removal of a floor covering made of tiles is a labor and time-consuming operation. If the aim of the restoration is to substitute only one or a few damaged tiles, this operation also becomes difficult, since the substitution of one tile preferably should not damage adjacent tiles.

In recent years, manufacturers have attempted to produce do-it-yourself tiling solutions that are easier to install. Some examples of these attempts are shown in WO 2004/097141 and WO 2008/097860. The floor elements disclosed in those documents can be laid on a surface and mechanically coupled together to form a floor covering without the use of an adhesive, thereby reducing the labor and time of the installing phase. Such kind of floor covering is known as a floating floor covering. In particular, in these documents, a ceramic tile or natural stone slab is fixed to a support layer that comprises coupling elements configured to realize a coupling with coupling elements of an adjacent floor element, thereby forming a floor covering.

A groutable vinyl-based floor tile for constructing a floating floor covering is known from US 2012/0240502. The floor tile has a decorative upper surface and a lower surface for supporting the floor tile. On one edge of the floor tile is a male coupling member and an opposing edge has a female coupling member for accepting the male coupling member of an adjacent floor tile. A grouting channel is formed between the edges of the adjacent tiles and a grout-accepting surface on the top surface of either the male or the female coupling member.

When laying floor elements which are provided with a tongue-and-groove connection along all four sides, a first row of elements is formed by inserting the tongue on a first edge of a new floor element into the groove on a second edge of an already laid floor element of the row to thereby form a row of floor elements which are joined along a first pair of opposite sides. To form a second row, the tongue on a third edge of a new floor element is inserted into the groove on a fourth edge of an already laid floor element in the first row to thereby form a joint along a second pair of opposite sides of the floor elements. A subsequent floor element in the second row then has to be joined to both the adjacent floor element in the second row as well as to the floor elements of the first row. Typically, this is achieved by firstly inserting the tongue on the third edge of the subsequent floor element into the groove formed along the fourth edge of the first row of floor elements to make up the joint between second pairs of opposite sides. The subsequent floor element then has to be slid along the made-up joint to allow the tongue on the first edge of the subsequent floor element to engage with the groove on the second edge of the adjacent floor element of the second row.

Although the above-described laying procedure requires no adhesive and can normally be performed by the average handyman, it can be difficult to effect sliding of one floor element relative to another, particularly if the floor elements are heavy. Furthermore, and particularly for floor elements in which a ceramic tile or natural stone slab is fixed to a support layer made of a polymeric material, naturally occurring irregularities in the lower surface of the ceramic or stone surfaces may result in the support layer becoming slightly warped or bowed. As a consequence, it may become difficult to make up the coupling elements between adjacent floor elements.

BRIEF SUMMARY OF THE INVENTION

It is therefore an object of the present invention to provide a floor element which may be easily joined to further floor elements to form a floor covering having grout between adjacent floor elements.

In accordance with a first aspect, a floor element for forming a floor covering is provided. The floor element comprises a support layer having an upper surface extending in a horizontal plane, and a decorative layer on the upper surface of the support layer. The support layer has a first edge and a second edge forming a first pair of opposite sides; a third edge and a fourth edge forming a second pair of opposite sides, and coupling elements on at least the first pair of opposite sides. The coupling elements on the first pair of opposite sides are in the form of a tongue extending perpendicularly outwardly from the first edge in a horizontal direction, and a groove extending inwardly with respect to the second edge in the horizontal direction. The tongue has an upper surface and a lower surface, with the groove having a base, an upper lip having a lower surface extending from the base to the second edge and a lower lip extending from the base beyond the upper lip. In a coupled condition between a first floor element and a second floor element, a grout-receiving cavity is formed between the first edge of the support layer of the first floor element and the support layer of the second floor element. The grout-receiving cavity is partially delimited by the upper surface of the tongue and the lower surface of the upper lip of the groove, with the cavity extending to the base of the groove.

Since, in accordance with the present invention, a grout-receiving cavity is partially delimited by the upper surface of the tongue and the lower surface of the upper lip of the groove, with the cavity extending to the base of the groove, there is no contact between the upper surface of the tongue and the upper lip of the groove. This implies that it will be easier to slide one laid panel relative to an adjacent laid panel when assembling a floor covering since frictional forces will be less than if contact between the tongue and the upper lip were present. Furthermore, because the tongue is not constrained by the upper lip of the groove, it is still possible to make up the coupling elements even if the floor elements are slightly warped or bowed.

In one embodiment, the lower surface of the tongue comprises a protrusion having a first locking surface and the lower lip of the groove comprises a recess having a second locking surface such that, when two floor elements are in coupled condition, the first and second locking surfaces interact to prevent the joined floor elements from drifting apart in the horizontal direction.

To further facilitate the laying of a floor covering, the coupling elements may be arranged such that two floor elements can be joined together by way of an angling motion of one floor element relative to the other.

To provide stability to a laid floor covering, in one embodiment the lower lip of the groove has a lower lip thickness and the upper lip of the groove has an upper lip thickness, the lower lip thickness being greater than the upper lip thickness in any vertical plane through the upper lip. Preferably, the lower lip thickness is at least 1.5 times the upper lip thickness, more preferably between 2 and 3 times the upper lip thickness.

In the coupled condition of two floor elements, a clearance is provided between the upper surface of the tongue and the lower surface of the upper lip of the groove. The clearance extends in the horizontal direction over the entire lower surface of the upper lip to thereby form that portion of the grout-receiving cavity which is partially delimited by the upper surface of the tongue and the lower surface of the upper lip of the groove. As has already been intimated, the lack of contact between the tongue and the upper lip of the groove implies that the floor elements are easier to lay. Although the clearance between the tongue and the upper lip of the groove suggests that locking in a vertical direction is absent, this is not problematic since the weight of the floor elements tends to keep the floor elements in alignment during laying and, in a laid floor covering, the grout-receiving cavity will be filled with grout material, thereby mitigating possible relative displacement of adjacent floor elements.

To ensure that an adequate amount of grout material is present between the tongue and the upper lip of the groove in a floor covering, the clearance is between 0.2 mm and 1.0 mm, preferably between 0.3 mm and 0.7 mm. Furthermore, in the coupled condition of two floor elements, the first edge of the support layer of the first floor element may be spaced from the second edge of the support layer of the second floor element by a distance, the distance being between 0.5 mm and 2.5 mm, preferably between 1.0 mm and 2.0 mm, more preferably about 1.5 mm.

To ensure adequate strength of the tongue whilst facilitating filling of the grout-receiving cavity with grout material, the upper surface of the tongue is preferably stepped and comprises an essentially horizontal proximal surface, a downwardly tapering distal surface terminating in a tip of the tongue, and a transition step between the proximal surface and the distal surface. The upper lip of the groove may increase in thickness in a direction from the second edge of the support layer towards the base of the groove.

In one embodiment the essentially horizontal proximal surface of the tongue extends towards the tip of the tongue by a distance, the distance being no greater than the distance between the first edge of the support layer of the first floor element and the second edge of the support layer of the second floor element.

In a further embodiment, the first pair of opposite sides has a length measured from the third edge to the fourth edge of the support layer, and the coupling elements on the first pair of opposite sides extend along substantially the entire length measured from the third edge to the fourth edge. In this manner, a more reliable locking between two coupled panels can be assured, particularly when the grout-receiving cavity extends over substantially the entire length of the first pair of opposite sides when two floor elements are in a coupled condition.

The second pair of opposite sides may also be provided with corresponding coupling elements such that, in a coupled condition between two floor elements, a corresponding grout-receiving cavity is formed between the third edge of one floor element and the fourth edge of the other floor element.

According to a special embodiment of the invention said coupling elements are at least in part defined by the decorative layer. Preferably, the upper lip of the tongue, and the upper surface thereof, can be at least in part, preferably entirely, formed by a lower surface of the decorative layer. In this way the support layer can be made thinner with consequent weight and cost savings. Moreover, thanks to this solution grout receiving cavity can be enlarged. It is noted that according to this embodiment the second distance can be enlarged. Moreover, it is noted that the second first and second edge, and preferably the third and fourth edge, can be defined by side edges of the decorative layer. Advantageously, the lower surface of the decorative layer, in correspondence of said edge, can comprise a lower bevel in order to facilitate the insertion of the tongue, in the grove.

To facilitate laying of the floor elements, the support layer has a support layer thickness and the lower lip of the groove extends beyond the upper lip by a distance corresponding to between 0.5 and 1.5 times the support layer thickness. In this manner, the tongue of the to-be-laid floor element can be supported by the longer lower lip during an angling joining motion.

The support layer may have a support layer thickness of between 3.0 mm and 6.0 mm, more preferably between 4.0 mm and 5.0 mm, and may be made of a polymeric material, preferably a thermoplastic polymeric material, for example of PVC (polyvinyl chloride) or polyurethane, more particularly thermoplastic polyurethane. Examples of thermoplastic material are PVC, polyethylene, polypropylene and polyethylene terephthalate.

Of thermoplastic materials. PVC is a preferred choice for the support layer due to the balance between processability, physical and mechanical properties and cost.

The support layer can be made either of a flexible or, preferably, of a rigid PVC, wherein rigid PVC comprises an amount of plasticizer lower than 15 phr, and flexible PVC comprises an amount of plasticizer of 15 phr or higher, preferably more than 20 or more than 25 phr. Within the context of the present description. “rigid” means that the support layer, taken alone, bends under the own weight thereof less than 10 cm per meter and still better less than 5 cm per meter, whereas “flexible” means that the support layer, taken alone, bends under the own weight thereof more than 10 cm per meter. The support layer may also comprise a high amount of filler materials, such as minerals, for example chalk, talc, calcium carbonate, silica, with filler material being present in an amount above 40 wt. %, preferably above 50 wt. %, more preferably above 60 wt. %. The fillers add weight to the support layer and make the support layer effective in reducing the transmission of walking sound. Anyway, the content of filler should be preferably limited to below 80 wt. %, preferably below 75 wt. % in order to avoid excessively increasing the brittleness of the board. Rigid PVC provides for a support layer having good dimensional stability when exposed to variations of temperature. In other words, the expansion of the board, when exposed to high temperature, is limited thereby providing a good stability of the floor. A support layer made of flexible PVC has a lower dimensional stability but is more easily compressed and therefore its tendency to expand could be suppressed at least to some extent by other components of the floor elements.

The support layer may be made a material having a flexural modulus above 1.5 GPa, preferably above 3 GPa, more preferably above 5 GPa, for example, approximately 8 GPa. Said flexural modulus is preferably below 15 GPa, more preferably below 10 GPa. The support layer may also comprise a flexural strength between 20 MPa and 90 MPa, for example between 30 MPa and 50 MPa. In fact, the inventors have found that the rigidity of the support layer helps in absorbing impact energy, thereby improving the impact strength.

In a preferred embodiment, the support layer is made of rigid thermoplastic material, preferably PVC, having a content of mineral filler, preferably comprising calcium carbonate, between 50% and 75% by weight. According to this preferred embodiment, the support layer is made of a material having a flexural modulus between 5 GPa and 10 GPa, for example approximately 8 GPa. It is to be noted that floor elements made of rigid PVC (also known as SPC “solid polymer composite” or “stone polymer composite”) on the market, have a flexural modulus between 1.5 GPa and 3.5 GPa. The inventors have found that by increasing the filler content it is possible to make the material stiffer.

Preferably, the support layer is made of a material that comprises a thermal expansion coefficient below 85 μm/m per ° C., preferably below 60 μm/m per ° ° C. for example 50 μm/m per ° C. For example, thermal expansion coefficient of the support layer is comprised between 20 μm/m per ° C. and 85 μm/m per ° C. preferably between 40 μm/m per ° ° C. and 60 μm/m per ° C. This is the case when the support layer is made of a rigid plastic, for example rigid PVC, or when it is made of a fiber cement or mineral material.

Although according to a preferred embodiment the support layer comprises polymeric material, it is not excluded that according to alternative embodiments the support layer may comprise other materials. In fact, with the aim of the present invention the support layer may comprise any material suitable to be used as a support layer or substrate in furniture, wall coverings or floor panels. It is also preferable that the substrate is waterproof. For example, the support layer can comprise a cement-based material, or a mineral based material.

In case of cement-based material the support layer may comprise a fiber containing cement board, for example Portland cement board. With “fiber containing cement board” is intended a support layer containing at least a cement and a fibrous material, bonded together, for example pressed together, to form the board. The fibers can be for example polymeric fibers or natural fibers. The adhesion is preferably carried out under pressure either in a cold or warm condition.

In case of mineral-based material the support layer may comprise a fiber containing mineral board. With “fiber containing mineral board” is intended a support layer containing at least a mineral and a fibrous material, bonded together, for example pressed together, to form the board. For example, the mineral can comprise silica, calcium carbonate, gypsum and/or magnesium oxide. The fibers can be for example polymeric fibers or natural fibers, for example cellulose or wood fibers. The mineral-based material the support layer may comprise glass fibers, preferably non-woven fiberglass. The adhesion is preferably carried out under pressure either in a cold or warm condition.

In case of mineral-based material the support layer may comprises a multilayer structure. For example, the support layer can comprise a plurality of sheets or layers of mineral-based material bonded together to form the support layer. Said sheets can have the same composition or, preferably, said sheets can have different compositions. For example, the support layer can comprise an upper sheet, a lower sheet and at least an intermediate sheet, wherein said upper sheet and said lower sheet can have substantially the same composition that is different from the composition of the intermediate sheet. For example, the upper and lower sheets can comprise fiberglass, and/or a higher amount of fiber, preferably natural fiber, with respect to the intermediate sheet. This solution provides for an engineered substrate having the desired mechanical and physical properties, in particular in term of thermal stability and rigidity, and a low cost thank to an intermediate sheet having a cheaper composition. It is to be noted that the multilayer structure can comprise a plurality of sheets having different physical and/or mechanical characteristics. For example, said sheets can have different density and/or porosity. In a preferred example, the substrate can comprise a lower and/or a top sheet with lower porosity and an intermediate sheet with higher porosity to provide waterproofness while the intermediate layer help in keeping a lower overall density of the substrate and reducing the cost of the substrate itself.

In case of mineral-based material, examples of magnesium oxide-based boards are inter alia magnesium oxychloride-based support layer (Sorel cement), magnesium oxysulfate-based support layer and magnesium sulfate-based.

In case of mineral-based material the support layer may show density for example between 0.85 $g/cm^3$ and 2 $g/cm^3$, for example between 0.85 $g/cm^3$ and 1.5 $g/cm^3$.

It is to be noted that cement-based material and mineral-based material provide the advantage of a low flammability. Moreover, said cement-based material and mineral-based material are rigid and show a limited thermal expansion. Said thermal expansion is in fact very similar to that of stone-like material, therefore the floor elements result in a highly stable floor covering. It is also to be noted that the high rigidity of the cement-based material or mineral-based material provides an important contribution to the overall impact strength of the floor covering. Moreover, in particular the mineral-based material shows a relatively low density, so that a floor covering resulting from the combination of a support layer made of mineral-based material and a decorative layer made of stone-like material, like ceramic, provides a relatively light and stable floor element.

The decorative layer of a floor element of the invention can be a material selected from the group comprising ceramic, natural stone, concrete, glass and glass-ceramic, the decorative layer preferably being a ceramic tile or stone slab. Irrespective of its actual material, the decorative layer can be joined to the support layer by means of an intermediate layer. The intermediate layer may comprise a resin material, for example a thermosetting resin or thermoplastic resin. Examples of thermosetting resin are epoxy, polyurethane, cyanoacrylate, unsaturated polyester resin, reactive hotmelt or acrylic resin. Examples of thermoplastic resin are hot melt, polyester thermoplastic, vinyl etc. Preferably the resin is a rigid resin. In particular, according to one embodiment of the invention, the intermediate layer comprises an epoxy resin. It is also preferred that the epoxy is a bicomponent resin, i.e. a thermosetting resin obtained by curing at low temperature (for example at room temperature) a mixture of two components, namely a resin and a hardener.

The resin may comprise a modulus of elasticity above 0.1 GPa, preferably, above 0.5 GPa, for example above 1 GPa. Preferably, the resin comprises a modulus of elasticity between 1 and 1.5 GPa.

It is also preferable that the resin may comprise an elongation at break below 200%, more preferably below 150%, even more preferably below 100%, for example below 50%. Preferably said elongation at break of the resin may be above 1%, preferably above 10%.

The resin preferably comprises a tensile strength between 50 MPa and 90 MPa, more preferably between 60 MPa and 80 MPa, for example 75 MPa. Moreover, the resin preferably comprises a compressive strength between 90 MPa and 130 MPa, more preferably between 100 MPa and 120 MPa, for example 110 MPa. It is also preferable that the resin shows a hardness value of at least 50 measured on a Shore D scale.

The intermediate layer may cover 100 percent of the lower surface of the decorative layer. The resin is preferably provided onto the lower surface of the decorative layer in an amount above 150 g/sqm, more preferably above 200 g/sqm, for example 220 g/sqm.

Preferably, the decorative layer is mounted on the support layer in such a way that when the floor elements are in a coupled condition said intermediate distance is available between the edges of adjacent decorative layers, while the edges of the underlying support layer are coupled to each other by means of the available coupling elements. In particular the support layer comprises a portion that extend beyond at least one edge, preferably more than one, more preferably all the edges of the decorative layer. For example, the support layer can extend beyond the edges of the decorative layer of a predetermined distance, preferably but not necessarily said distance is the same on all the edges, in this case said predetermined distance is the half of said intermediate distance. For example, said intermediate distance can be of at least 1.5 millimeters, for example around 3 millimeters.

A floor element according to the invention may have a total thickness of between 8 mm and 25 mm, preferably between 12 mm and 20 mm.

Finally, a further aspect of the present invention relates to a floor covering comprising a plurality of the above-described floor elements. Optionally, an underlayer is provided beneath the floor elements, the underlayer preferably being made of a crosslinked polyolefin foam. As also mentioned above, preferably, in a coupled condition of two of said floor elements an intermediate distance is available between the respective upper edges of the decorative layer.

Preferably said intermediate distance between the floor elements can be filled by a grout thereby providing an impermeable floor covering. Preferably, said grout can at least partially fill the grout receiving cavity. Preferably a polymeric and/or cement-based grout is used. The grout may be a flexible or rigid grout. A flexible grout may be for example a silicone-based grout whereas a rigid grout may be for example an epoxy-based grout or cement-based grout. Epoxy-based, and silicone-based are example of polymeric grout, other examples of polymeric grout are polyurethane-based or acrylic-based grout.

In the preferred embodiment, the grout can show a compressive strength above 20 MPa, for example comprised between 24 and 60 MPa. Preferably, the grout can show an hardness Shore A above 70, for example between 80 and 90.

BRIEF DESCRIPTION OF THE DRAWINGS

With the intention of better showing the characteristics of the invention, in the following, as an example without any limitative character, several preferred forms of embodiments are described with reference to the accompanying drawings, wherein.

DETAILED DESCRIPTION OF THE INVENTION

Figure 1:
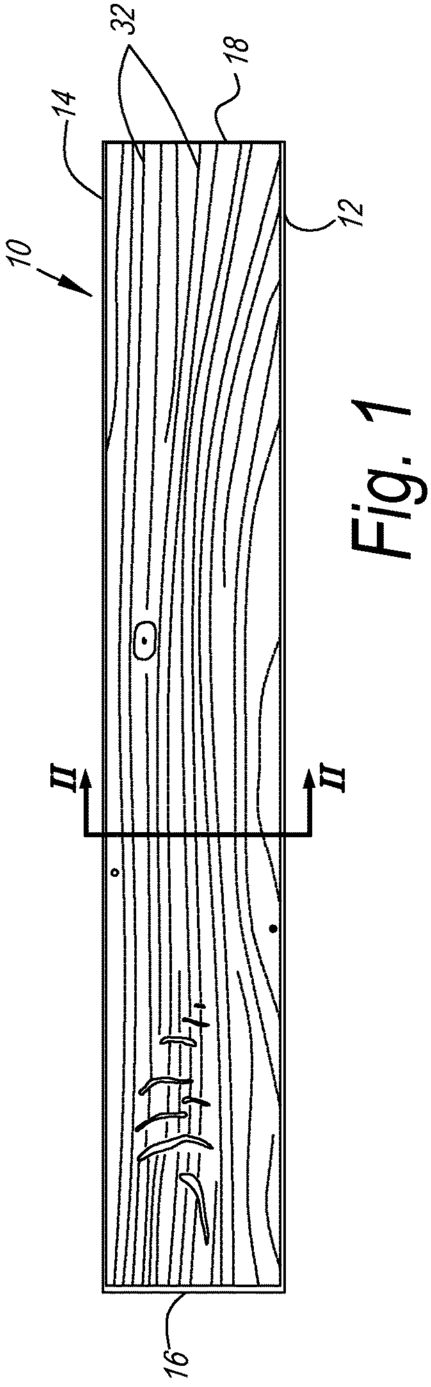
FIG. 1 shows a plan view of an embodiment of a floor element of the invention.

In the drawings, reference number 10 denotes a floor element 10 according to the invention. As illustrated in FIG. 1, the floor element 10 may have a rectangular elongated shape. Alternatively, the floor element may be square. Generally, the floor element 10 may have a major surface area of less than 1.5 $m^2$, preferably less than 1.0 $m^2$, more preferably less than 0.4 $m^2$. Irrespective of its major surface area, the floor element 10 has a first edge 12 and a second edge 14 forming a first pair of opposite sides and a third edge 16 and a fourth edge 18 forming a second pair of opposite sides. The edges may have a maximum length of less than 1.5 m, preferably less than 0.9 m.

Figure 2:
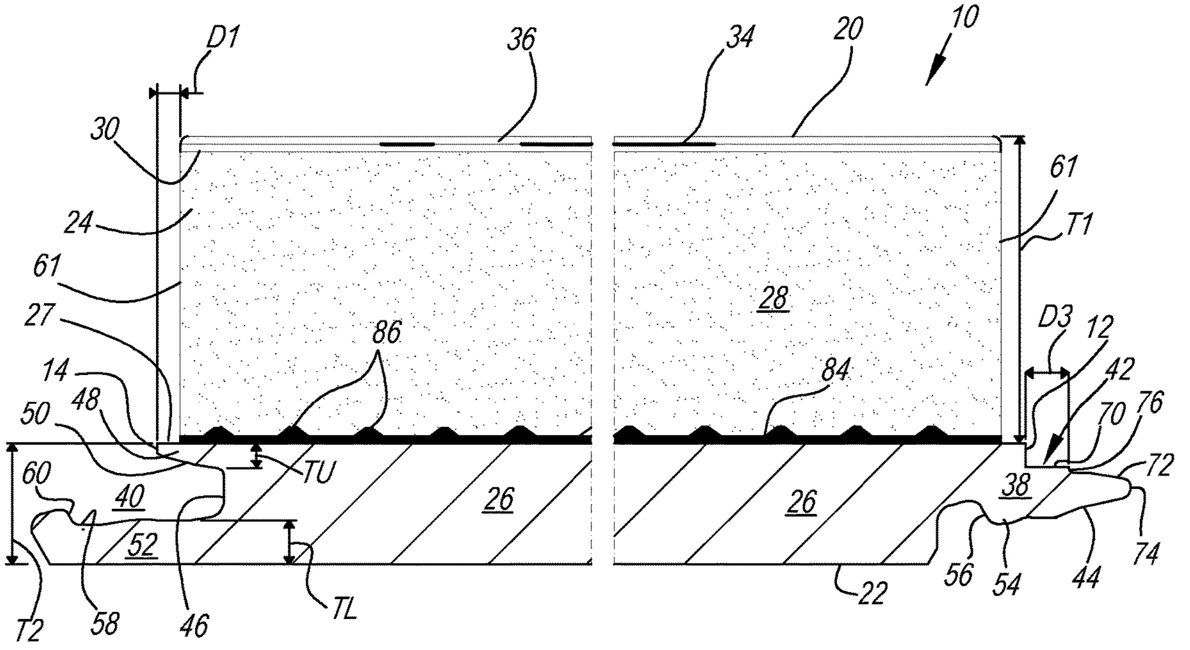
FIG. 2, on a larger scale, shows a cross-section along line II-II of FIG. 1.

As is perhaps most clearly derivable from FIG. 2, the floor element 10 has an upper surface 20 and a lower surface 22 opposite the upper surface. The upper surface 20 is constituted by a decorative layer 24. In the illustrated embodiment, the lower surface 22 is provided on a support layer 26. The support layer 26 has an upper surface 27 extending in a horizontal plane and the decorative layer 24 is provided on the upper surface 27 of the support layer 26.

According to the illustrated example the decorative layer 24 comprises a body 28 made of a ceramic material, for example red body ceramic, porcelain, stoneware, earthenware, or other sintered ceramic powders. In one embodiment, the decorative layer 24 is a ceramic tile or slab. The expression "ceramic tile" relates to an element with a substantially flat body consisting of baked minerals, such as clay, and preferably with a fired decorative top surface, preferably but not necessarily, on the basis of a glaze. In the illustrated embodiment, the decorative layer 24 may further comprise a background coating 30 covering at least partially an upper surface of the body 28, for example comprising at least a glaze. The background coating 30 is adapted to receive a décor 32 on its top. The background coating 30 can be white, beige, brown or of any color suitable to receive the décor 32 on its top.

The décor 32 can be provided with a variety of textures, designs and colors. In the illustrated example (see FIG. 1) the décor 32 simulates a wood pattern comprising wood nerves and flakes. Preferably, the décor 32 is at least partially formed by a print 34. The print 34 is preferably realized by means of digital printing, such as inkjet printing, although screen printing, rotogravure, flexography or off-set printing is not excluded.

The decorative layer 24 may further comprise a protective coating 36 covering at least partially the upper surface of the body 28, for example comprising at least a glaze. The protective coating 36 is adapted to be placed above the décor 32 and is transparent or translucent.

FIG. 2 also shows that the decorative layer 24 has a thickness T1. The thickness T1 may be comprised between 4 mm and 15 mm, for example 6 mm, preferably above 7 mm, for example 8 mm or 10 mm.

It is noted that the decorative layer 24 may have a density expressed as surface weight of at least 2 kg/sqm, preferably at least 5 kg/sqm, for example above 10 kg/sqm. High density of the decorative layer may improve installation of the floor covering and, in particular, a vertical locking between the floor elements as will be described below in more detail. It is also preferred that the decorative layer comprises a density expressed as surface weight of less than 35 kg/sqm, preferably below 30 kg/sqm, for example below 25 kg/sqm. In fact, an excessively heavy decorative layer may affect the maneuverability of the floor element 10 as well as complicating the packaging and the transportation thereof.

The support layer 26, according to one example, is made of a polymeric material, preferably a thermoplastic material, for example of PVC (polyvinyl chloride) or polyurethane, more particularly thermoplastic polyurethane. Examples of thermoplastic material are PVC, polyethylene, polypropylene and polyethylene terephthalate. Of thermoplastic materials, PVC is a preferred choice for the support layer due to the balance between processability, physical and mechanical properties and cost.

The support layer 26 can be made either of a flexible or, preferably, of a rigid PVC, wherein rigid PVC comprises an amount of plasticizer lower than 15 phr, and flexible PVC comprises an amount of plasticizer of 15 phr or higher, preferably more than 20 phr or more than 25 phr.

In a preferred embodiment, the support layer 26 is made of rigid thermoplastic material, preferably PVC, having a content of mineral filler, preferably comprising calcium carbonate, between 50% and 75% by weight.

Furthermore, the support layer 26 may have a thickness T2 comprised between 3.5 mm and 6 mm, preferably between 4 mm and 5 mm, more preferably about 4.5 mm. Thus, the total thickness of the floor element may be between 8 mm and 25 mm, preferably between 12 mm and 20 mm. In this way, the thickness of the resulting floor element is relatively thin, so that the impact of the floor in the environment is reduced, especially in case of restoration of existing flooring. Moreover, in this way, the surface weight of the floor element is limited so that the packaging, transportation and installation are made easier.

In a particular embodiment wherein the decorative layer 24 is made of porcelain and comprises a thickness of 8.5 mm and wherein the support layer 26 is made of PVC and comprises a thickness of 4 mm, the surface weight of the floor element is approximatively 24 kg/sqm. Thanks to this, a favorable balance between economy of transport and packaging and easiness of installation is achieved. In fact, a weight above said limits may help the coupling between two floor elements, especially in improving a vertical locking between them.

In accordance with the present invention, the support layer 26 is provided with coupling elements on at least the first pair of opposite sides of the floor element 10. The coupling elements on the first pair of opposite sides are in the form of a tongue 38 extending along a length of the first edge 12 and a groove 40 extending along a length of the second edge 14. With particular reference to FIG. 2, the tongue 38 has an upper surface 42 and a lower surface 44. The groove 40 has a base 46, an upper lip 48 having a lower surface 50 extending from the base 46 to the second edge 14 and a lower lip 52 extending from the base 46 beyond the upper lip 48. The lower surface of the tongue may comprise a protrusion 54 having a first locking surface 56. The lower lip 52 of the groove 40 may comprise a recess 58 having a second locking surface 60). In a coupled condition of two floor elements, the protrusion 54 along the first edge 12 of one floor element is accommodated in the recess 58 of the other floor element so that the first and second locking surfaces 56, 60 interact to prevent the joined floor elements from drifting apart in a horizontal direction perpendicular to the joined edges.

Figure 3:
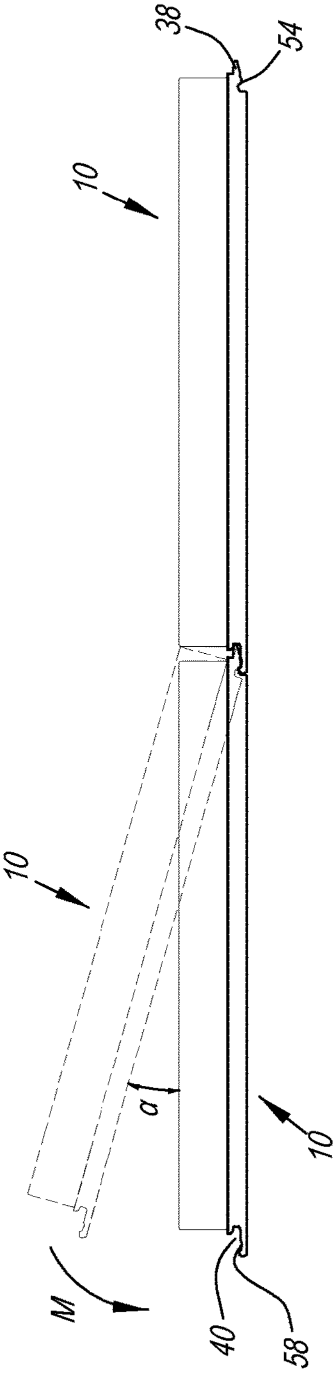
FIG. 3 illustrates schematically how two floor elements may be coupled together.

As is schematically illustrated in FIG. 3, the coupling elements 38, 40 are preferably arranged such that two floor elements 10 can be joined together by way of an angling motion M. Thus, a to-be-laid floor element is held at an angle $\alpha$ to the horizontal and its tongue 38 is inserted into the groove 40 of an already laid floor element. The to-be-laid floor element is then angled down until the protrusion 54 on the tongue 38 is accommodated in the recess 58 of the groove 40 and the floor elements 10 are level with each other.

To allow the tongue 38 to be inserted into the groove 40 at an angle $\alpha$, it is advantageous if the support layer 26 extends beyond longitudinal edges 61 of the decorative layer 24. In the illustrated embodiment (see FIG. 2), the second edge 14 of the support layer 26 extends beyond the longitudinal edge 61 of the decorative layer by a first distance $D_1$. Preferably, though not necessarily, the first edge 12 of the support layer may extend beyond the longitudinal edge 61 of the support layer by the same distance. Suitable values for the first distance $D_1$ have been found to be between 0.5 mm and 2.5 mm, preferably between 1.0 mm and 2.0 mm, more preferably about 1.5 mm. As will be explained below, the provision of the distances $D_1$ also means that a grouting channel 62 is formed between two coupled floor elements.

Figure 4:
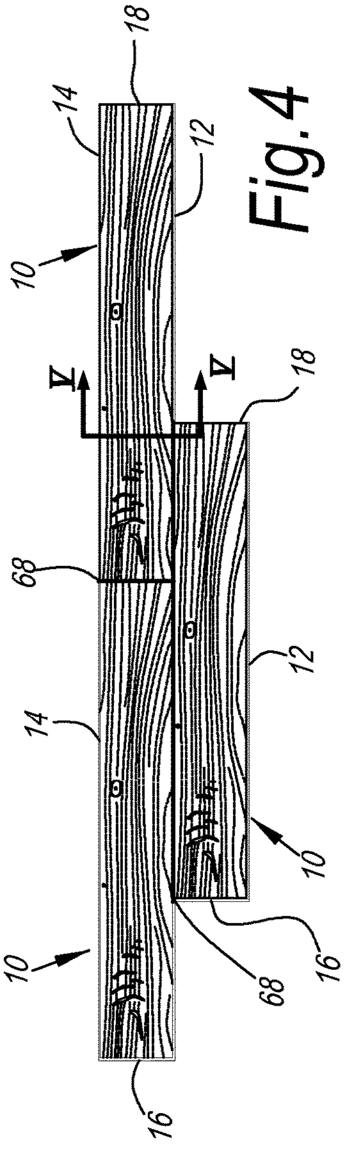
FIG. 4 shows a plan view of a part of a floor covering according to an embodiment of the invention.
Figure 5:
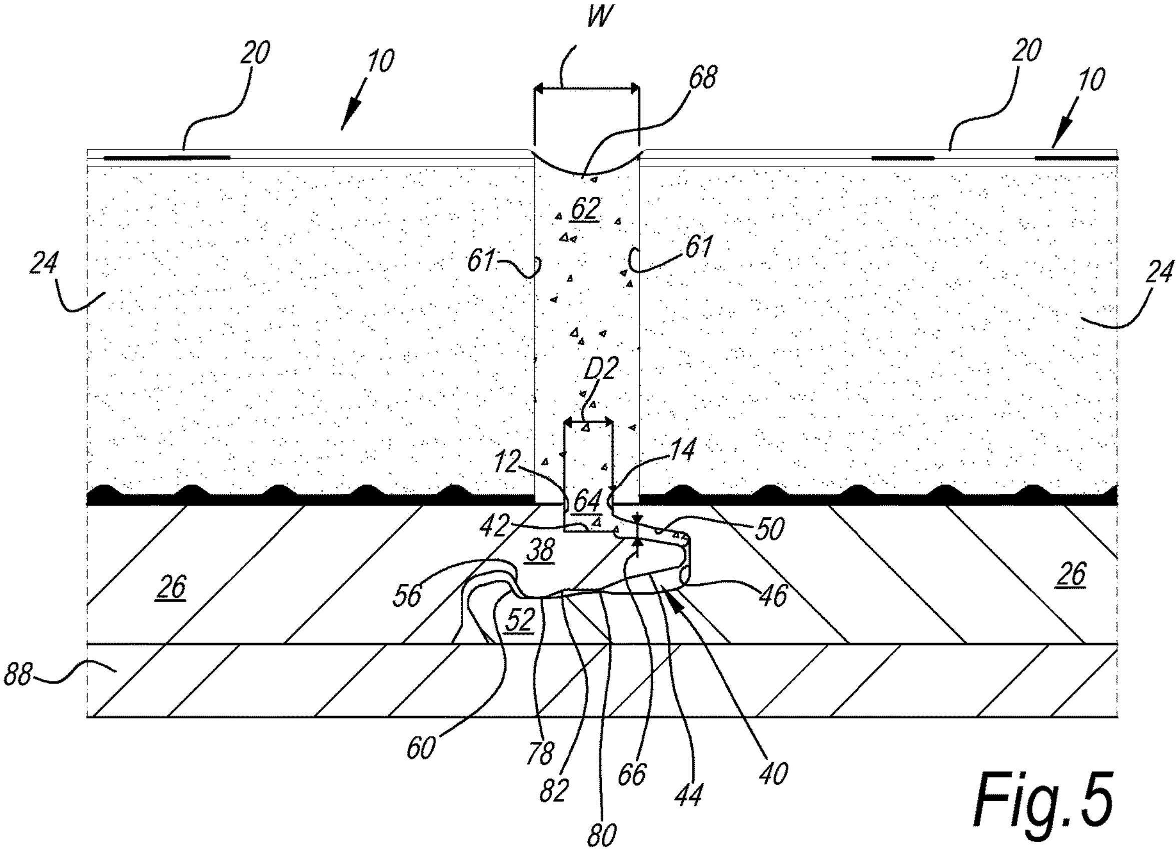
FIG. 5, on a larger scale, shows a cross-section along line V-V of FIG. 4.

FIG. 4 is a plan view showing three floor elements 10 of a floor covering and FIG. 5 is a cross-sectional view along line V-V of FIG. 4. With reference to FIG. 5, in a coupled condition between a first floor element and a second floor element, a grouting channel 62 is formed between facing longitudinal edges 61 of the decorative layers 28. In addition, and in accordance with the present invention, a grout-receiving cavity 64 is formed between the first edge 12 of the support layer 26 of the first floor element and the support layer 26 of the second said floor element. The grout-receiving cavity 64 is partially delimited by the upper surface 42 of the tongue 38 and the lower surface 50 of the upper lip 48 of the groove 40, with the cavity extending to the base 46 of the groove. In this respect, a clearance 66 may provided between the upper surface 42 of the tongue 38 and the lower surface 50 of the upper lip 48 of the groove 40, with the clearance 66 extending in the horizontal direction over the entire lower surface 50 of the upper lip to thereby form that portion of the grout-receiving cavity 64 which is partially delimited by the upper surface 42 of the tongue 38 and the lower surface 50 of the upper lip 48 of the groove. The clearance may be between 0.2 mm and 1.0 mm, preferably between 0.3 mm and 0.7 mm.

In the coupled condition of two floor elements, the first edge 12 of the support layer 26 of the first floor element 10 is spaced from the second edge 14 of the support layer 26 of the second floor element 10 by a second distance $D_2$. The second distance $D_2$ may advantageously be between 0.5 mm and 2.5 mm, preferably between 1.0 mm and 2.0 mm, more preferably about 1.5 mm. In such an embodiment, the grouting channel 62 therefore has a width W equal to the sum of $D_1 \times 2$ and $D_2$.

In FIG. 5, grout material 68 is shown filling both the grouting channel 62 and the grout-receiving cavity 64. Preferably, the grout material is polymeric and/or cement-based. The grout material may be a flexible or rigid grout. A flexible grout material may be for example a silicone-based grout, whereas a rigid grout material may be for example an epoxy-based grout or cement-based grout. Epoxy-based, and silicone-based are examples of polymeric grout material, other examples of polymeric grout material are polyurethane-based or acrylic-based grout.

In a preferred embodiment, the grout material 68 can show a compressive strength above 20 MPa, for example comprised between 24 MPa and 60 MPa. Preferably, the grout material can show a Shore A hardness above 70, for example between 80 and 90.

To facilitate the introduction of the grout material 68 into the grout-receiving cavity 64, the upper surface 42 of the tongue 38 may be stepped. In this manner, and as is most clearly seen in FIG. 2, the upper surface 42 comprises an essentially horizontal proximal surface 70, a downwardly tapering distal surface 72 terminating in a tip 74 of the tongue, and a transition step 76 between the proximal surface 70 and the distal surface 72. The essentially horizontal proximal surface 70 may extend towards the tip 74 by a third distance $D_3$, the third distance being no greater than the second distance $D_2$ between the first edge 12 of the support layer 26 of the first floor element 10 and the second edge 14 of the support layer 26 of the second floor element 10.

In the embodiment shown in FIG. 5, the tip 74 of the tongue 38 is spaced from the base 46 of the groove 40 when the first and second locking surfaces 56, 60 of the coupling elements contact each other. In this manner, friction during sliding of one laid floor element along another during installation of the floor covering can be reduced.

To aid stability of a laid floor covering, the lower lip 52 of the groove 40 of the support layer 26 may be thicker than the upper lip 48. Thus, the lower lip has a lower lip thickness TL and the upper lip has an upper lip thickness TU, the lower lip thickness being greater than the upper lip thickness in any vertical plane through upper lip (see FIG. 2). Preferably, the lower lip thickness TL is at least 1.5 times the upper lip thickness TU, more preferably between 2 and 3 times the upper lip thickness. Furthermore, the upper lip 48 of the groove 40 can increase in thickness in a direction from the second edge 14 of the support layer 26 towards the base 46 of the groove.

As will be apparent from FIG. 5, in addition to there being contact between the tongue and the groove at the locking surfaces 56, 60, the lower surface 44 of the tongue is arranged to contact the lower lip 52 of the groove at only two further points of contact, namely at a first point of contact 78 between the tip of the protrusion 54 on the tongue 38 and the base of the recess 58 in the lower lip 52, and at a second point of contact 80 at a location closer to the tip 74 of the tongue and base 46 of the groove. In this manner, a dust chamber 82 is created between the two points of contact, thereby improving the reliability of the coupling between the floor elements.

The first pair of opposite sides formed by the first edge 12 and the second edge 14 of the support layer 26 has a length measured from the third edge 16 to the fourth edge 18 of the support layer. In a preferred embodiment, the coupling elements on the first pair of opposite sides extend along substantially the entire length measured from the third edge to the fourth edge. In this manner, the grout-receiving cavity will extend over substantially the entire length of the first pair of opposite sides when two floor elements are in coupled condition. However, it is to be understood that the principles underlying the present invention may be incorporated in floor elements in which the coupling elements are interrupted, for example by means of removal of all or some of the tongue 38 and/or lower lip 52 at one or more regions along the length of the first and second edges 12, 14.

In a preferred embodiment of the invention, the second pair of opposite sides is provided with corresponding coupling elements such that, and as is derivable from FIG. 4, in a coupled condition between two floor elements, a corresponding grout-receiving cavity is formed between the third edge 16 of one floor element and the fourth edge 18 of the other floor element.

In a further aspect of the present invention, the floor element 10 may comprise an intermediate layer 84 disposed between the decorative layer 24 and the support layer 26. The intermediate layer 84 may comprise a resin material.

In a preferred example illustrated in FIG. 2, the intermediate layer 84 is in direct contact with the upper surface 27 of the support layer 26 so as to act as a glue between the decorative layer 24 and the support layer 26.

In the embodiment of FIG. 2 the decorative layer 24 comprises a back surface having a structure, said structure comprising excavations 86 with a depth of less than 0.5 mm, for example between 0 mm and 0.4 mm. The excavations 86 are preferably disposed in a pattern having lines running in a longitudinal direction of the decorative layer 24 and they are preferably continuous and with a zig zag shape. Preferably, the decorative layer 24 comprises, at least in correspondence of its lower surface, an open porosity adapted to be permeated by the resin of the intermediate layer 84.

Thus, according to a preferred aspect of the invention, the decorative layer 24 comprises an apparent porosity between 0.1% and 10% determined according to ASTM C373, more preferably between 2% and 8%, for example 6%. Furthermore, the decorative layer may preferably have a volume of open pores comprised between 0.01 cc (cubic centimeter) and 1 cc, more preferably between 0.10 cc and 0.90 cc, for example 0.60 cc.

Therefore, in order to properly flow into said open pores, the resin can exhibit a viscosity at 20° ° C. below 1000 mPas, preferably below 800 mPas, more preferably below 600 mPas, for example approximately 400 mPas. Within the scope of the invention "viscosity" means the viscosity of the uncured resin, for example the viscosity of the mixture of the two components before the completion of the curing, i.e. during the so-called pot life.

According to another aspect of the invention, the floor covering comprises an underlayer 88 disposed beneath the floor elements 10 (see FIG. 5). Preferably, the underlayer is configured to act as a moisture and/or noise barrier. The underlayer 88 may be made of a polymeric material, preferably a thermoplastic material. In the most preferred embodiment, the underlayer is made from a compressible material, more preferably a foamed material. A compressible material is a preferred choice since it can help the underlayer to absorb unevenness of the subfloor to avoid lippage in the floor covering. Moreover, the inventors have found that a compressible underlayer is deformed under the weight of the floor elements and after a settling period the floor covering becomes more rigid and stable thereby improving at the same time, the fatigue resistance of the floor and its planarity. According to a preferred embodiment of the invention the underlayer comprises, for example is made of, crosslinked polyolefin foam such as, for example, crosslinked polyethylene foam, or crosslinked polypropylene foam. Alternatively, the underlayer can be made of other polymers, possibly foamed, like, for example, expanded polystyrene, rubber, polyurethane.

Preferably, the underlayer 88 has a thickness below 4 mm, for example below 3 mm. In an embodiment of the invention the underlayer has a thickness above 1 mm, for example above 1.5 mm. Preferably, the underlayer has a thickness comprised between 1 mm and 3 mm, preferably 2 mm.

Preferably, the underlayer 88 may comprise an impact insulation class higher or equal to IIC 66 measured according to ASTM E492. The underlayer may show; also, a sound transmission class higher or equal to STC 66 measured according to ASTM E90. The underlayer may show a compressive strength comprised between 50 kPa and 500 kPa, at 0.5 deflection, measured according to ASTM D3575.

Figure 6:
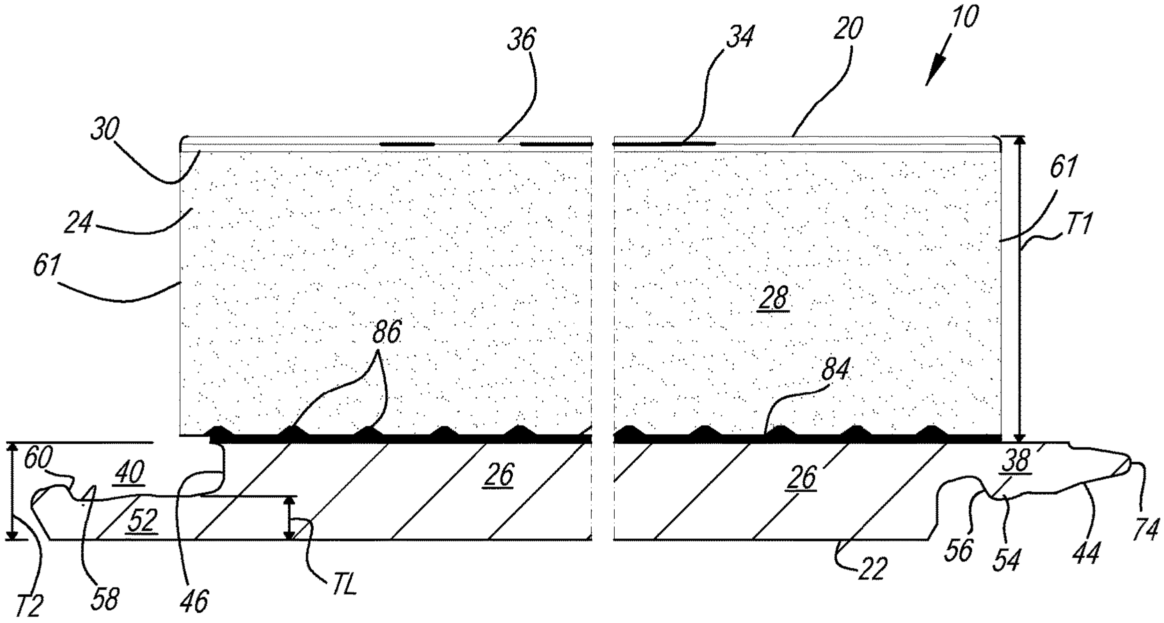
FIGS. 6 and 7 show the same view of FIGS. 4 and 5 but according to a special embodiment of the invention.
Figure 7:
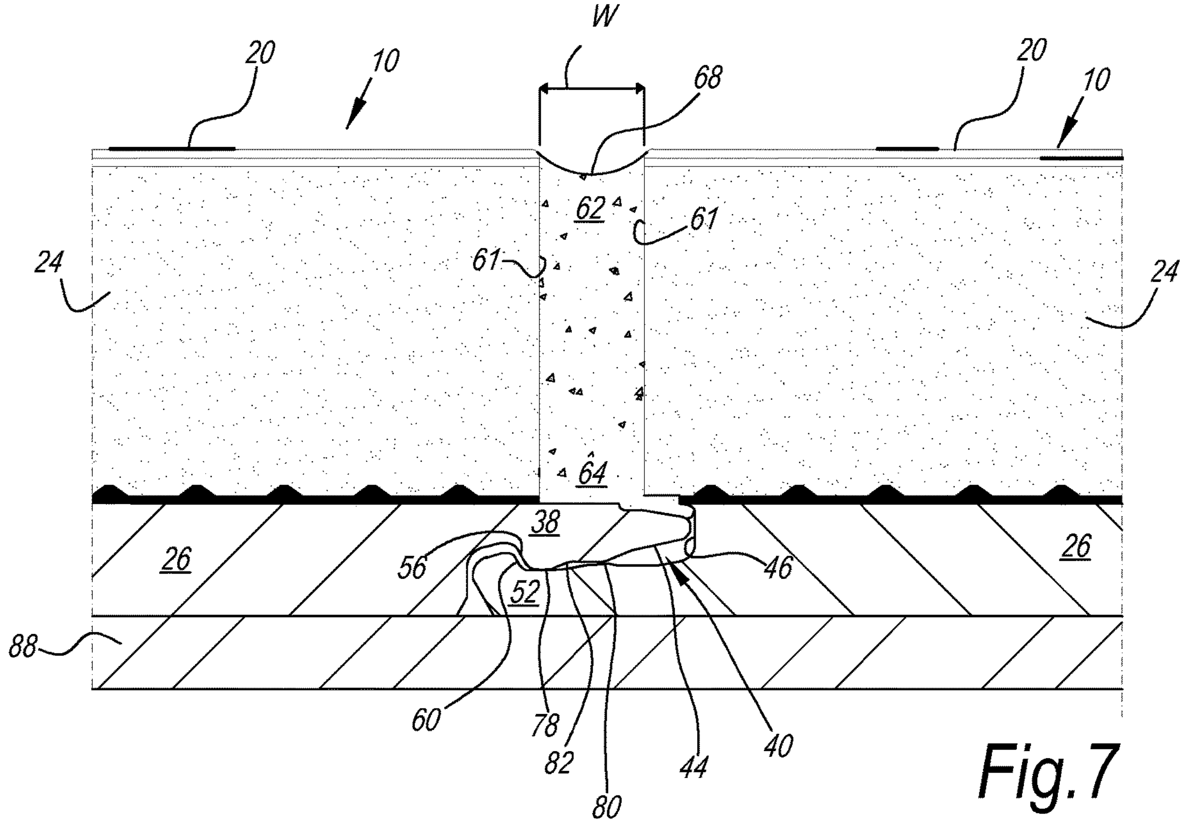

FIGS. 6 and 7 show a special embodiment that differs from that of FIGS. 4 and 5 only in that the upper lip of the groove 40 is formed by the lower surface of the decorative layer 24. As a consequence of this feature the thickness T2 of the support layer 26 can be reduced.

The present disclosure is not limited to the embodiments illustrated in the drawings and/or claimed in the appended claims. Rather, it is to be understood that combinations of features laid out in the following items 1 to 26 are expressly disclosed.

Item 1.—A floor element for forming a floor covering, said floor element comprising:

- a support layer having an upper surface extending in a horizontal plane, and
- a decorative layer on said upper surface of said support layer, said support layer having:
- a first edge and a second edge forming a first pair of opposite sides;
- a third edge and a fourth edge forming a second pair of opposite sides;
- coupling elements on at least said first pair of opposite sides, said coupling elements on said first pair of opposite sides being in the form of a tongue extending perpendicularly outwardly from said first edge in a horizontal direction, and a groove extending inwardly with respect to said second edge in said horizontal direction,
- the tongue having an upper surface and a lower surface, with the groove having a base, an upper lip having a lower surface extending from said base to said second edge and a lower lip extending from said base beyond said upper lip,
- wherein, in a coupled condition between a first said floor element and a second said floor element, a grout-receiving cavity is formed between the first edge of the support layer of said first floor element and the support layer of said second said floor element, the grout-receiving cavity being partially delimited by said upper surface of said tongue and said lower surface of said upper lip of said groove, the cavity extending to the base of the groove.

Item 2.—The floor element according to item 1, wherein said lower surface of said tongue comprises a protrusion having a first locking surface and said lower lip of said groove comprises a recess having a second locking surface such that, when two floor elements are in said coupled condition, said first and second locking surfaces interact to prevent the joined floor elements from drifting apart in the horizontal direction.

Item 3.—The floor element according to either item 1 or item 2, wherein said coupling elements are arranged such that two floor elements can be joined together by way of an angling motion of one floor element relative to the other.

Item 4.—The floor element according to any of the preceding items, wherein the lower lip of the groove has a lower lip thickness and the upper lip of the groove has an upper lip thickness, the lower lip thickness being greater than the upper lip thickness in any vertical plane through the upper lip.

Item 5.—The floor element according to item 4, wherein the lower lip thickness is at least 1.5 times the upper lip thickness, more preferably between 2 and 3 times the upper lip thickness.

Item 6.—The floor element according to any of the preceding items, wherein, in said coupled condition of two floor elements, a clearance is provided between said upper surface of said tongue and said lower surface of said upper lip of said groove, said clearance extending in the horizontal direction over the entire lower surface of the upper lip to thereby form that portion of said grout-receiving cavity which is partially delimited by said upper surface of said tongue and said lower surface of said upper lip of said groove.

Item 7.—The floor element according to item 6, wherein said clearance is between 0.2 mm and 1.0 mm, preferably between 0.3 mm and 0.7 mm.

Item 8.—The floor element according to any of the preceding items, wherein, in said coupled condition of two floor elements, said first edge of said support layer of said first floor element is spaced from said second edge of said support layer of said second said floor element by a second distance, said second distance being between 0.5 mm and 2.5 mm, preferably between 1.0 mm and 2.0 mm, more preferably about 1.5 mm.

Item 9.—The floor element according to any of the preceding items, wherein said upper surface of said tongue is stepped and comprises an essentially horizontal proximal surface, a downwardly tapering distal surface terminating in a tip of said tongue, and a transition step between said proximal surface and said distal surface.

Item 10.—The floor element according to any of the preceding items, wherein said upper lip of said groove increases in thickness in a direction from the second edge of said support layer towards said base of said groove.

Item 11.—The floor element according to any of items 8 to 10, wherein said essentially horizontal proximal surface of said tongue extends towards the tip of the tongue by a third distance, said third distance being no greater than said second distance between said first edge of said support layer of said first floor element and said second edge of said support layer of said second said floor element.

Item 12.—The floor element according to any of the preceding items, wherein said first pair of opposite sides has a length measured from said third edge to said fourth edge of said support layer, and said coupling elements on said first pair of opposite sides extend along substantially the entire length measured from said third edge to said fourth edge.

Item 13.—The floor element according to item 12, wherein said grout-receiving cavity extends over substantially the entire length of said first pair of opposite sides when two floor elements are in said coupled condition.

Item 14.—The floor element according to any of the preceding items, wherein said second pair of opposite sides is provided with corresponding coupling elements such that in a coupled condition between two floor elements, a corresponding grout-receiving cavity is formed between the third edge of one floor element and the fourth edge of the other floor element.

Item 15.—The floor element according to any of the preceding items, wherein said support layer has a support layer thickness and said lower lip of said groove extends beyond the upper lip by a distance corresponding to between 0.5 and 1.5 times the support layer thickness.

Item 16.—The floor element according to item 15, wherein said support layer thickness is between 3.5 mm and 6.0 mm, more preferably between 4.0 mm and 5.0 mm.

Item 17.—The floor element according to any of the preceding items, wherein said support layer is made of a polymeric material, preferably a thermoplastic polymeric material.

Item 18.—The floor element according to item 17, wherein said thermoplastic polymeric material is a rigid or flexible PVC.

Item 19.—The floor element according to item 18, wherein said rigid or flexible PVC comprises filler material such as chalk and/or calcium carbonate, said filler material being present in an amount above 40 wt. %, preferably above 50 wt. %, more preferably above 60 wt. %.

Item 20.—The floor element according to any of the preceding items, wherein said decorative layer is a material selected from the group comprising ceramic, natural stone, concrete, glass and glass-ceramic, said decorative layer preferably being a ceramic tile or slab.

Item 21.—The floor element according to any of the preceding items, wherein said decorative layer is joined to said support layer by means of an intermediate layer.

Item 22.—The floor element according to item 21, wherein said intermediate layer comprises epoxy, polyurethane, unsaturated polyester, vinyl ester or cyanoacrylate resin.

Item 23.—The floor element according to any of the preceding items, wherein said floor element has a total thickness of between 8 mm and 25 mm, preferably between 12 mm and 20 mm.

Item 24.—The floor element according to any of the preceding items, wherein said upper lip is at least in part, preferably entirely, formed by a lower surface of said decorative layer.

Item 25.—A floor covering comprising a plurality of floor elements according to any of the preceding items.

Item 26.—The floor covering according to item 24, wherein an underlayer is provided beneath the floor elements, the underlayer preferably being made of a cross-linked polyolefin foam.

The invention has been described above by way of example only and the skilled person will understand that the floor element of the invention may be varied in many ways without departing from the scope of the invention as defined in the appended claims.

The invention claimed is:

1. A floor element for forming a floor covering, said floor element comprising:

- a support layer having an upper surface extending in a horizontal plane, and
- a decorative layer on said upper surface of said support layer, said support layer having:
  - a first edge and a second edge forming a first pair of opposite sides;
  - a third edge and a fourth edge forming a second pair of opposite sides;
  - coupling elements on at least said first pair of opposite sides, said coupling elements on said first pair of opposite sides being in a form of a tongue extending perpendicularly outwardly from said first edge in a horizontal direction, and a groove extending inwardly with respect to said second edge in said horizonal direction,
  - the tongue having an upper surface and a lower surface, with the groove having a base, an upper lip having a lower surface extending from said base to said second edge and a lower lip extending from said base beyond said upper lip,
    - wherein, in a coupled condition between a first said floor element and a second said floor element, a grout-receiving cavity is formed between the first edge of the support layer of said first floor element and the support layer of said second floor element, the grout-receiving cavity being partially delimited by said upper surface of said tongue and said lower surface of said upper lip of said groove, the grout-receiving cavity extending to the base of the groove.

2. The floor element according to claim 1, wherein said lower surface of said tongue comprises a protrusion having a first locking surface and said lower lip of said groove comprises a recess having a second locking surface such that, in said coupled condition of two floor elements, said first and second locking surfaces interact to prevent the joined floor elements from drifting apart in the horizontal direction.

3. The floor element according to claim 2, wherein said coupling elements are arranged such that two floor elements can be joined together by way of an angling motion of one floor element relative to the other.

4. The floor element according to claim 1, wherein the lower lip of the groove has a lower lip thickness and the upper lip of the groove has an upper lip thickness, the lower lip thickness being greater than the upper lip thickness in any vertical plane through the upper lip.

5. The floor element according to claim 4, wherein the lower lip thickness is at least 1.5 times the upper lip thickness.

6. The floor element according to claim 1, wherein, in said coupled condition of two floor elements, a clearance is provided between said upper surface of said tongue and said lower surface of said upper lip of said groove, said clearance extending in the horizontal direction over the entire lower surface of the upper lip to thereby form a portion of said grout-receiving cavity, wherein said portion of said grout-receiving cavity is partially delimited by said upper surface of said tongue and said lower surface of said upper lip of said groove.

7. The floor element according to claim 6, wherein said clearance is between 0.2 mm and 1.0 mm.

8. The floor element according to claim 1, wherein, in said coupled condition of two floor elements, said first edge of said support layer of said first floor element is spaced from said second edge of said support layer of said second said floor element by a second distance, said second distance being between 0.5 mm and 2.5 mm.

9. The floor element according to claim 1, wherein said upper surface of said tongue is stepped and comprises an essentially horizontal proximal surface, a downwardly tapering distal surface terminating in a tip of said tongue, and a transition step between said proximal surface and said distal surface.

10. The floor element according to claim 9, wherein said essentially horizontal proximal surface of said tongue extends towards the tip of the tongue by a third distance, said third distance being no greater than said second distance between said first edge of said support layer of said first floor element and said second edge of said support layer of said second said floor element.

11. The floor element according to claim 1, wherein said upper lip of said groove increases in thickness in a direction from the second edge of said support layer towards said base of said groove.

12. The floor element according to claim 1, wherein said first pair of opposite sides has a length measured from said third edge to said fourth edge of said support layer, and said coupling elements on said first pair of opposite sides extend along substantially the entire length measured from said third edge to said fourth edge.

13. The floor element according to claim 12, wherein said grout-receiving cavity extends over substantially the entire length of said first pair of opposite sides in said coupled condition of two floor elements.

14. The floor element according to claim 1, wherein said second pair of opposite sides are provided with corresponding coupling elements such that in a coupled condition between two floor elements, a corresponding grout-receiving cavity is formed between the third edge of one floor element and the fourth edge of the other floor element.

15. The floor element according to claim 1, wherein said support layer has a support layer thickness and said lower lip of said groove extends beyond the upper lip by a distance corresponding to between 0.5 and 1.5 times the support layer thickness.

16. The floor element according to claim 15, wherein said support layer thickness is between 3.5 mm and 6.0 mm.

17. The floor element according to claim 1, wherein said support layer is made of a thermoplastic polymeric material.

18. The floor element according to claim 1, wherein said decorative layer is a material selected from the group comprising ceramic, natural stone, concrete, glass and glass-ceramic.

19. The floor element according to claim 18, wherein said decorative layer is joined to said support layer by means of an intermediate layer comprising epoxy, polyurethane, unsaturated polyester, vinyl ester or cyanoacrylate resin.

20. A floor covering comprising a plurality of floor elements according to claim 1.

* * * * *